(12) United States Patent
Choate

(10) Patent No.: US 7,636,990 B1
(45) Date of Patent: Dec. 29, 2009

(54) SNAP HOOK WITH HOOP-LOADED GATE

(76) Inventor: Gary E Choate, 4894 Van Gordon St., Suite 311, Wheatridge, CO (US) 80033

( * ) Notice: Subject to any disclaimer, the term of this patent is extended or adjusted under 35 U.S.C. 154(b) by 0 days.

(21) Appl. No.: 12/079,126

(22) Filed: Mar. 25, 2008

(51) Int. Cl.
*F16B 45/02* (2006.01)

(52) U.S. Cl. .................................... 24/600.1

(58) Field of Classification Search ............. 24/595.5, 24/600.1; 294/82.2
See application file for complete search history.

(56) References Cited

U.S. PATENT DOCUMENTS

| | | |
|---|---|---|
| 1,525,292 A | 2/1925 | Greve |
| 1,622,971 A | 3/1927 | Porter |
| 1,626,866 A | 5/1927 | Neilson |
| 1,753,326 A | 4/1930 | Yingling |
| 1,879,168 A | 9/1932 | Freysinger |
| 1,949,608 A | 3/1934 | Johnson |
| 1,985,596 A | 12/1934 | Bumham |
| 2,197,997 A | 4/1940 | Dee |
| 2,490,931 A | 12/1949 | Thompson |
| 2,514,656 A | 7/1950 | Manson |
| 2,657,446 A | 11/1953 | Roberts |
| 3,317,972 A | 5/1967 | Harley |
| 3,949,451 A | 4/1976 | Bunn |
| 4,062,092 A | 12/1977 | Tamada et al. |
| 4,122,585 A | 10/1978 | Sharp |
| 4,179,148 A | 12/1979 | Johnson |
| 4,434,536 A | 3/1984 | Schmidt et al. |
| 4,528,728 A | 7/1985 | Schmidt et al. |
| 4,528,729 A | 7/1985 | Schmidt et al. |
| 4,546,523 A | 10/1985 | Bailey |
| 4,908,913 A | 3/1990 | Mori |
| 4,977,647 A | 12/1990 | Casebolt |
| 5,257,441 A | 11/1993 | Barlow |
| 5,579,564 A | 12/1996 | Rullo |
| 5,694,668 A | 12/1997 | Rohlf |
| 5,735,025 A | 4/1998 | Bailey |
| 5,896,630 A | 4/1999 | Smith et al. |
| 6,161,264 A | 12/2000 | Choate |
| 6,283,524 B1 | 9/2001 | Simond |
| 6,363,589 B1 | 4/2002 | Calloway et al. |
| 6,718,601 B1 | 4/2004 | Choate |
| 6,832,417 B1 | 12/2004 | Choate |
| 2005/0229367 A1* | 10/2005 | Thompson ............... 24/599.9 |

OTHER PUBLICATIONS

Simpson, Robert, letter dated Oct. 11, 2007, announcing the filing of patent application directed at snap hook shown in accompanying illustrations.

* cited by examiner

*Primary Examiner*—James R Brittain
(74) *Attorney, Agent, or Firm*—Ramon L. Pizarro; Edwin H. Crabtree

(57) ABSTRACT

A snap-hook having a locking element and a gate, where the locking element cooperates with the gate to place stresses on the gate in tension instead of shear is disclosed. The tension loads are achieved by using mating generally cylindrical surfaces on the gate and on the lock.

1 Claim, 8 Drawing Sheets (KNOWN ART)

SNAP HOOK WITH HOOP-LOADED GATE

REFERENCE TO RELATED APPLICATIONS

This application is discloses a hook with a locking gate. A hook with a locking gate is also disclosed in my co-pending application having Ser. No. 11/713,766, filed Mar. 2, 2007, titled Tie-back snap hook.

BACKGROUND OF THE INVENTION (a) Field of the Invention

This invention generally relates to a snap hook with an improved gate mechanism that allows the gate to be loaded in hoop stresses as compared to shear or conventional two-dimensional loads.

(b) Discussion of Known Art

Snap hooks with locking gates that prevent the undesired and unintentional disengagement of the connecting hardware have been used for decades in combination with lanyards for fall protection of workers. However, a limitation of known devices has been inefficient design of the locking gates and the manner of cooperation of the locking gate with the body of the hook to resist external loads, especially loads that are directed to the side (normal to the direction of opening) the gate and to the "top" (in the direction of opening) of the gate. The gate of the snap hook has to be able to resist external loads without opening or resulting in failure by exceeding the strength of the material that comprises the gate. Thus the need for greater safety has been identified by industry, and as a result ANSI (American National Standards Institute) standards have been adopted to address this issue. Previously, gate top and side load strength of snap hooks were developed as an OSHA (Occupational Safety and Health Administration) standard, which allowed these loads to be just under 350 pounds. Under the new, ANSI, regulations the gates must be able to withstand a minimum of 3500 pounds of side and top load.

While it is possible to increase the strength of components by merely making them thicker, that is by adding material. This approach does not always work, particularly with the design of the gate on a highly stressed snap hook. The thickening of the gate results in less space for the structure of the hook itself, or results in a much larger, heavier hook, which is more difficult to carry and use by workers that must carry and use these hooks while attached to lanyards.

SUMMARY

It has been discovered that the problems left unanswered by known art can be solved by providing a hook with a locking gate that includes:

A hook body having a J-shaped body with a shank and a curved portion, the curved portion extending from the shank and terminating in a nose that is at a distance from the shank to define a mouth;

A gate, the gate having a pair of sidewalls, at least one of the sidewalls having being generally fan-shaped shaped, the gate being pivotally mounted from the hook body and having a gate wall that is adapted for closing the mouth of the hook body, the gate wall having a generally cylindrical inner gate wall surface that extends between the pair of sidewalls, the gate being movable from a first gate position where the gate wall closes the mouth of the hook to a second gate position where the gate wall is away from the nose, providing access through the mouth;

A gate lock, the gate lock having an external cylindrical surface that is adapted for mating with the cylindrical inner gate wall, the gate lock being pivotally mounted from the hook body, the gate lock being moveable from a first lock position where the external cylindrical surface of the gate lock is next to the cylindrical inner gate wall surface when the gate lock is in the first gate position and inhibiting rotation of the gate relative to the hook body, to a second lock position where the external cylindrical surface of the gate lock is no longer next the cylindrical inner surface of the gate wall, thereby allowing the gate to be moved to the second gate position.

According to a highly preferred embodiment of the invention the cylindrical inner surface of the gate wall extends continuously between the sidewalls of the gate. However, it is contemplated that approximations of this will achieve the loading of the gate in hoop-stress while the gate lock is in the first lock position while resisting a load against the gate wall, towards the mouth of the body.

Still further, it is contemplated that the disclosed invention will include a spring that simultaneously biases both the gate and the gate lock towards the first gate position and the first lock position, respectively. In order to ensure consistent collapse and retention of the spring, a biasing tab is incorporated into the gate in order to predisposition the spring in an arched position. It has been found that this provides a reliable compression of the spring in a manner that prevents the spring from buckling into a direction that would impede the opening of the hook when desired.

It should also be understood that while the above and other advantages and results of the present invention will become apparent to those skilled in the art from the following detailed description and accompanying drawings, showing the contemplated novel construction, combinations and elements herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
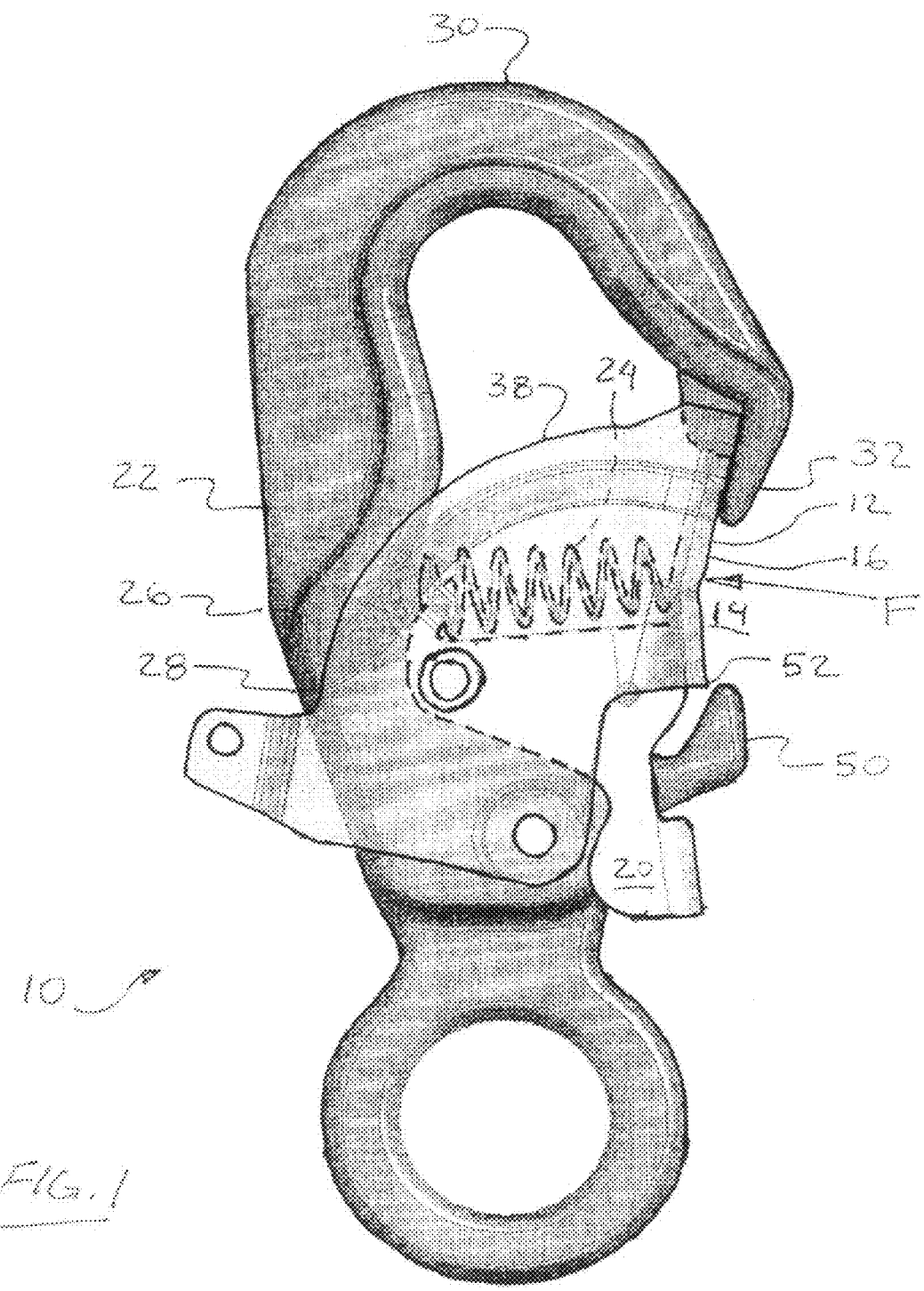
FIG. 1 is a side view of a preferred example of the invention, with the main components shown as being transparent to facilitate understanding of the arrangement. The view illustrates the gate in its closed gate position.
Figure 2:
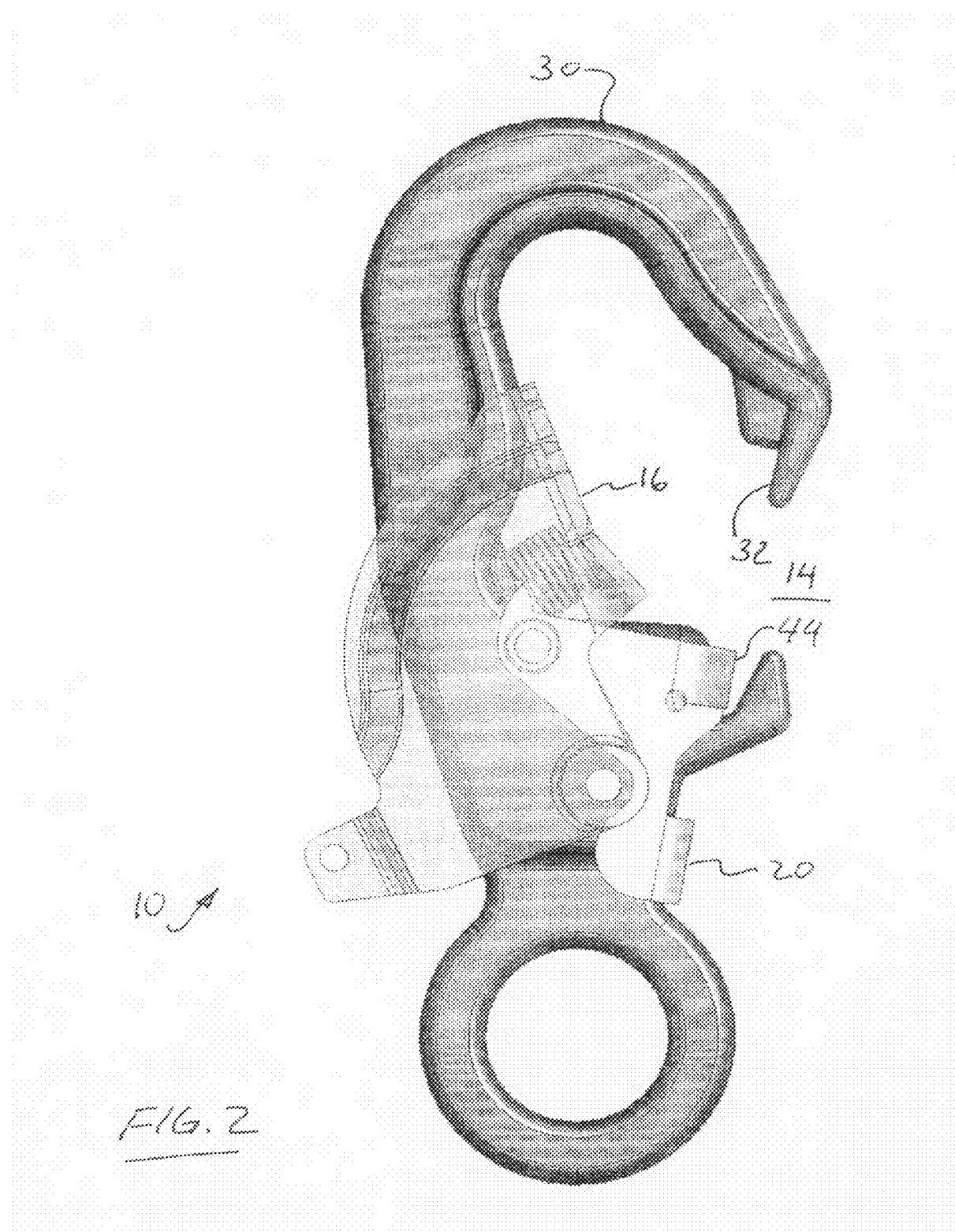
FIG. 2 is a side view as illustrated in FIG. 1, with the gate in its open gate position.

Turning now to FIGS. 1 and 2 where a hook 10 with a locking gate 12 has been shown while the gate 12 is reacting a force "F" against the gate 12. In FIG. 1, the gate 12 is shown in a first gate position, where the gate 12 closes the mouth 14 of the hook 10. The force F is directed against the gate wall 16, in a direction that urges the gate 12 to move to a second gate position, illustrated in FIG. 2, where the mouth 14 of the hook 10 is open. In FIG. 1, the force F is resisted by the gate 12 while the gate is held in the first gate position by a gate lock 20.

Figure 3:
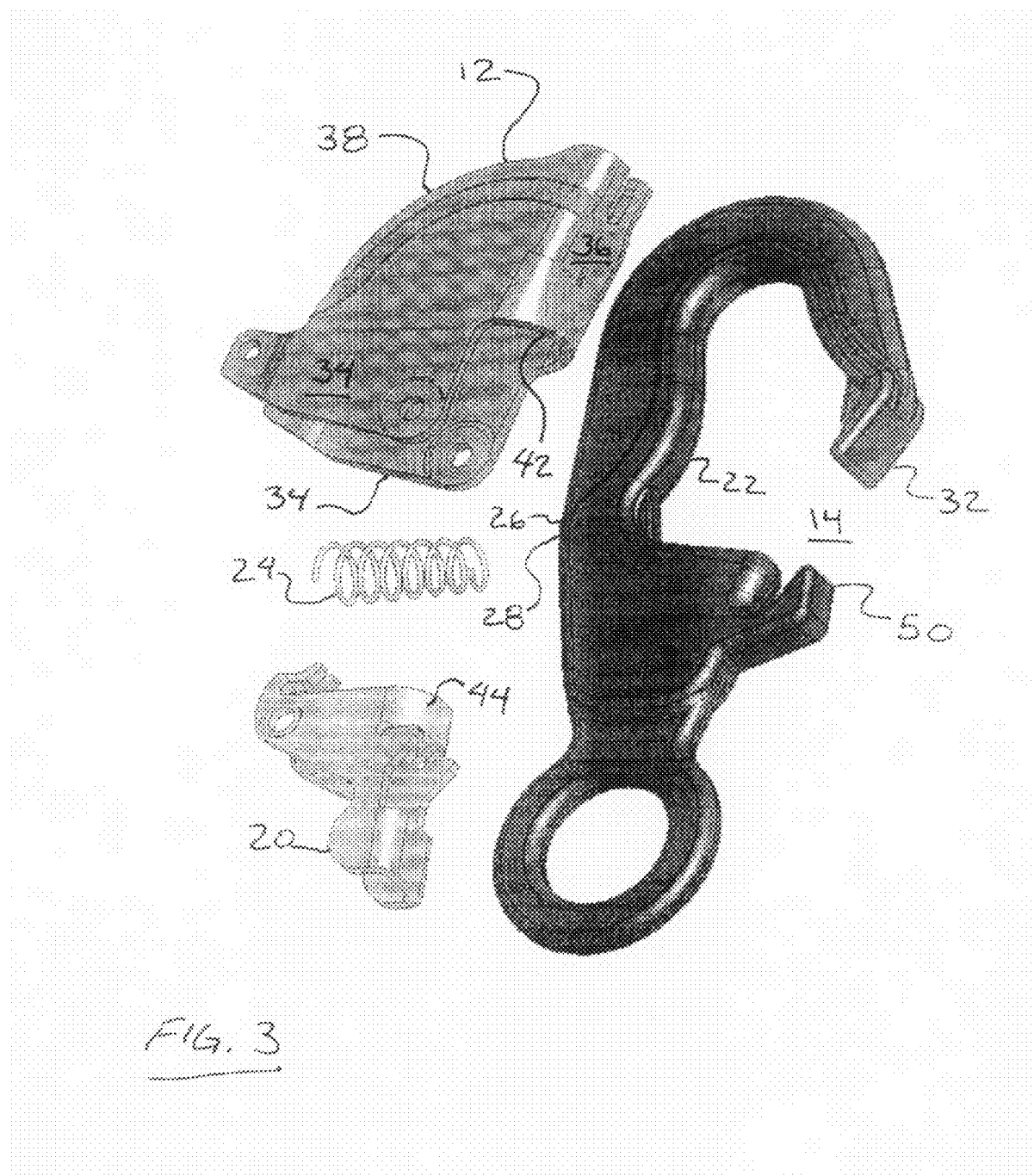
FIG. 3 is an exploded view of the main components used to make the disclosed invention. A gate-mounted thumb-pad that is used to pull the gate to the open position has is not shown.
Figure 4:
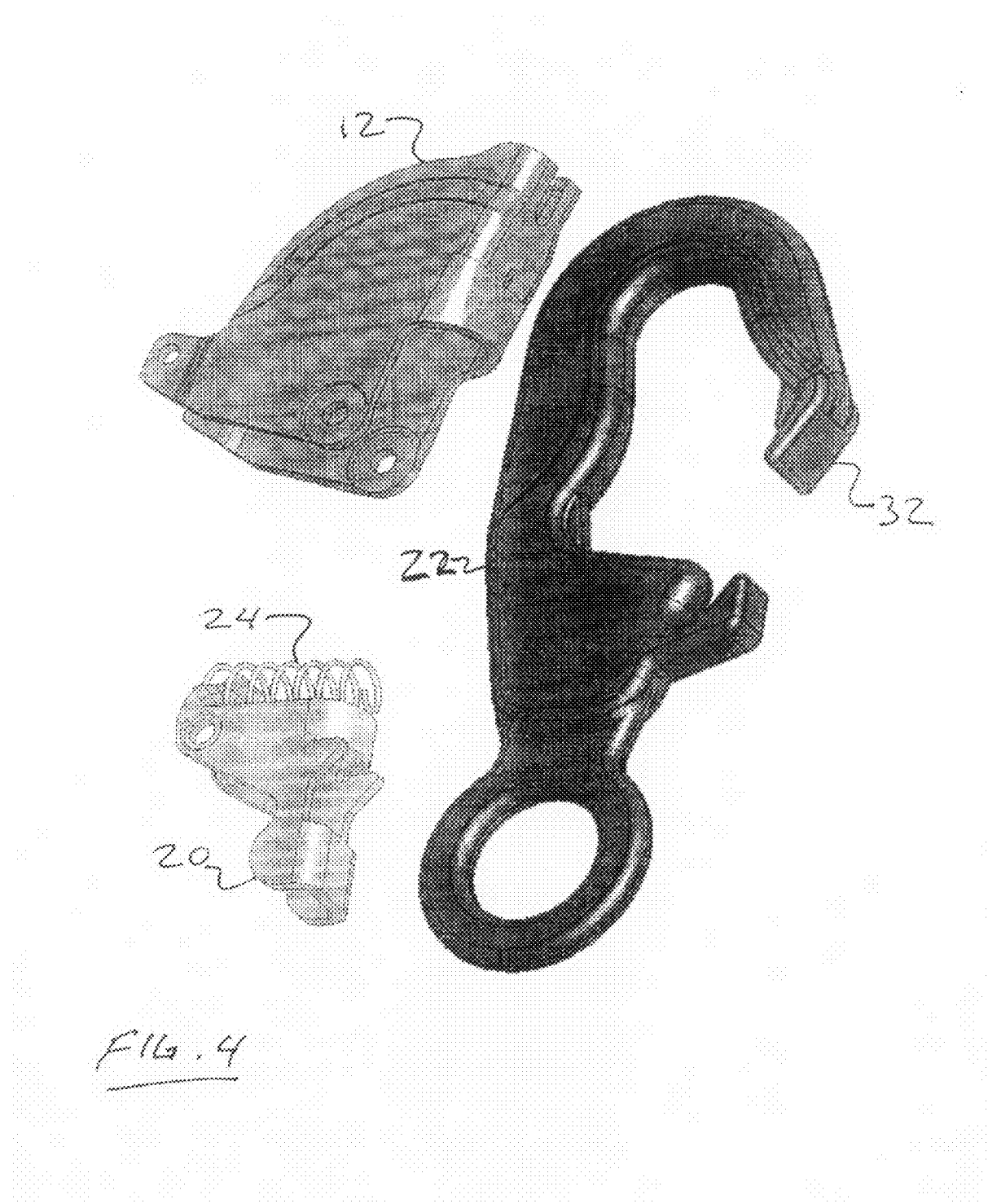
FIG. 4 illustrates the placement of the spring against the lock during assembly.
Figure 5:
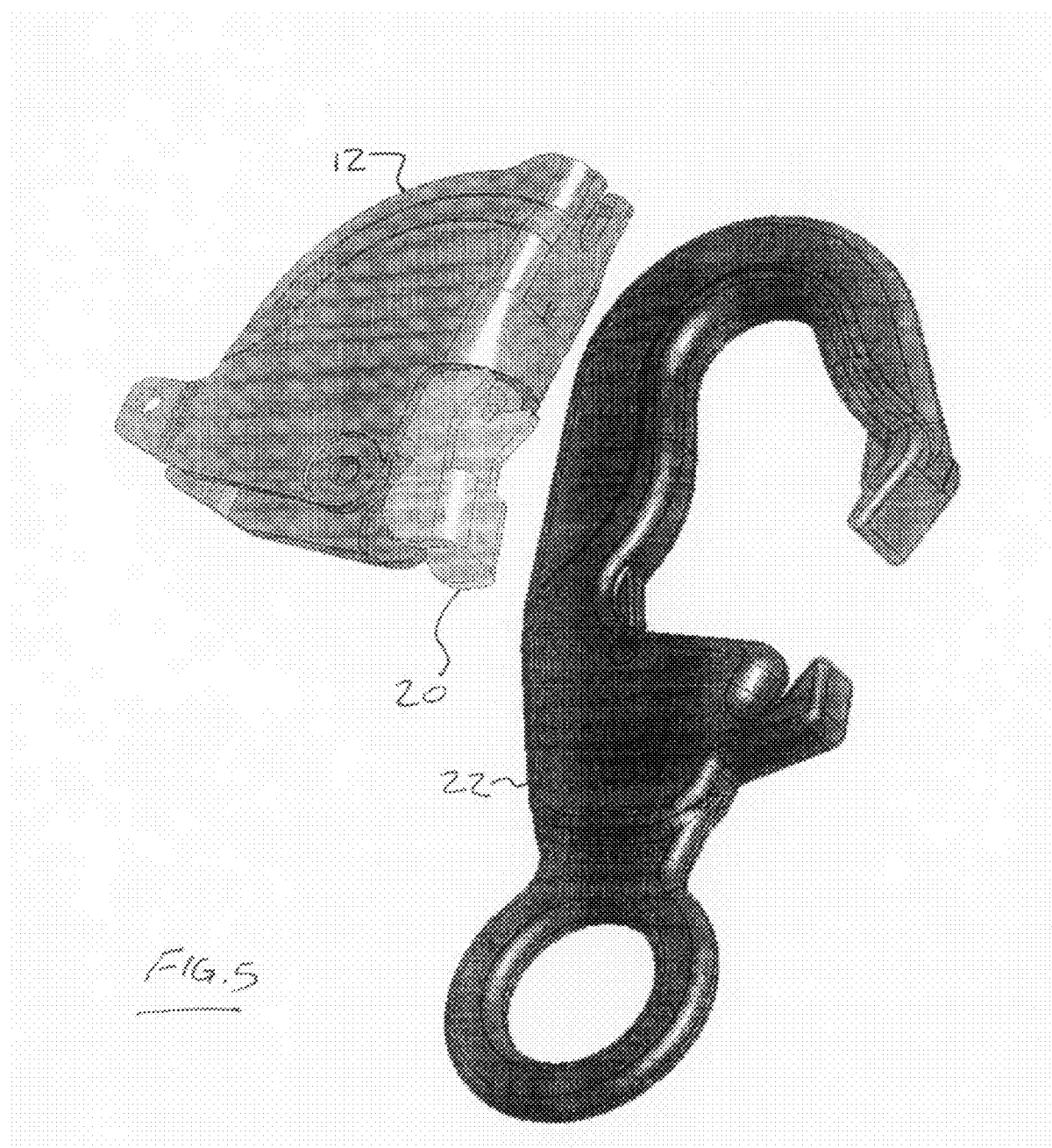
FIG. 5 illustrates the placement of the lock and spring into the gate during assembly.

Turning now to FIG. 3, it will be understood that the hook 10 will include a hook body 22, the gate 12, the lock 20, and preferably a spring 24 that urges the gate 12 to the first gate position, illustrated in FIG. 1. The hook body 22 includes a J-shaped body 26 with a shank 28 and a curved portion 30. The curved portion 30 of the hook body 22 extends from the shank 28 and ends in a nose 32 that is at a distance from the shank 28 to define the mouth 14 of the hook.

Also illustrated in FIG. 3 is the gate 12, which includes a pair of sidewalls 34 that extend from a gate wall 36, with the gate wall 36 being positioned between the sidewalls 34. Also illustrated is that it is preferred that at least one of the sidewalls 34 have a generally fan-shaped profile 38. The fan-shaped profile restricts the area where items engaged by the hook (such as D-rings, lanyards, life-lines or attachment points) can be held.

FIGS. 1-2, show that the gate 12 is pivotally mounted from the hook body 22, and that the gate wall 36 is adapted for closing the mouth 14 of the hook body. Additionally, as illustrated in FIGS. 3-5 and 8, the gate wall 36 will include a generally cylindrical inner gate wall surface 42. This cylindrical inner gate wall surface 42 extends between the pair of sidewalls 34. The curvature will be adapted for mating with or matching the generally cylindrical external cylindrical surface 44 found on the gate lock 20.

Figure 8:
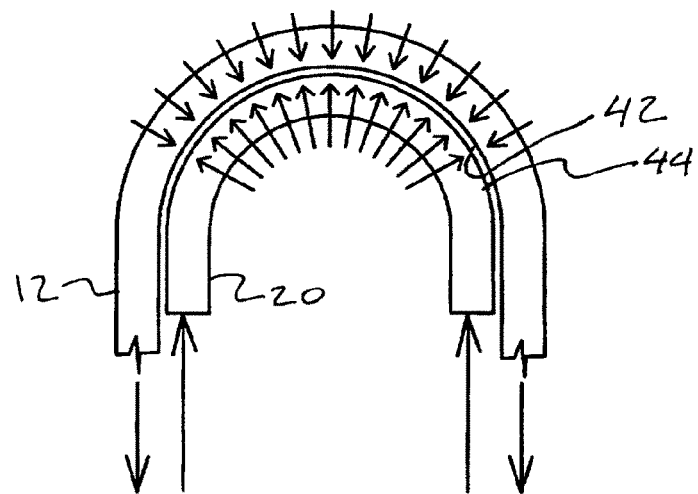
FIG. 8 illustrates the load distribution and reaction of the gate load "F" shown in FIG. 1 between the gate and the lock while using the disclosed invention. The load being reacted as "hoop loads."
Figure 9:
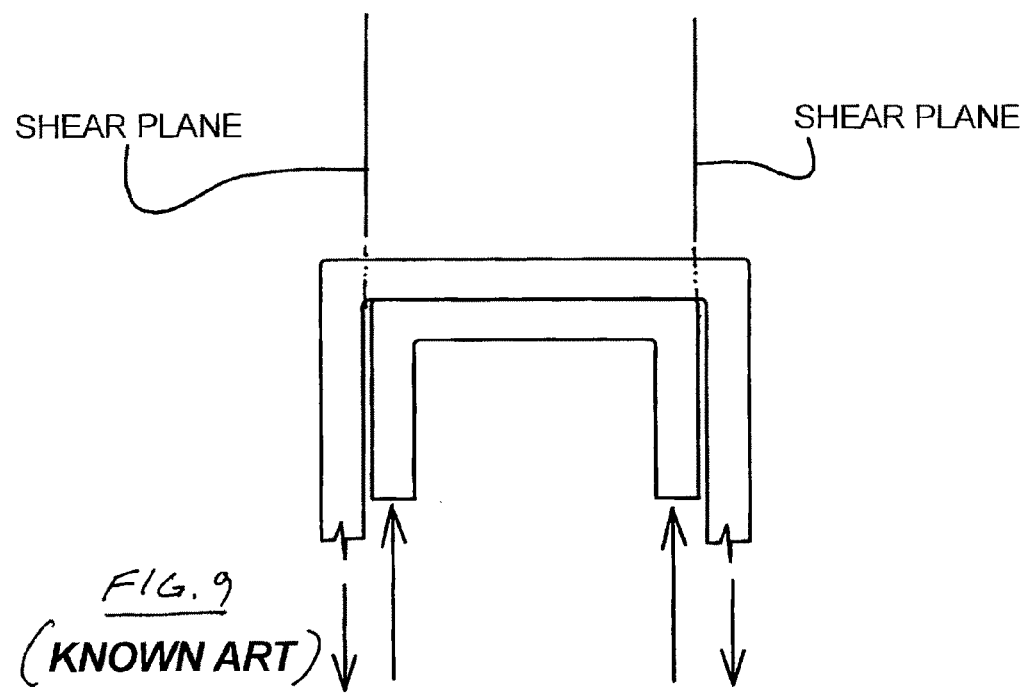
FIG. 9 illustrates load transfer and reaction of a gate load such as the gate load "F" of FIG. 1 from the gate to the lock as found in known snap hooks, where the load is reacted primarily in shear. Since the loading is modified from shear to direct tension in the gate, and compression in the gate lock, the strength of the gate is doubled.

The mating of the cylindrical inner wall gate surface 42 and the external cylindrical surface 44 of the gate lock 20 is of significant importance. FIG. 8 illustrates the reactions and the cooperation of these components in resisting the forces such as force F against the gate (illustrated in FIG. 1). The force F will cause the cylindrical inner wall gate surface 42 to bear the external cylindrical surface 44. It is believed that the cylindrical shape of these mating surfaces places the gate wall in hoop-stress, much like a pressure vessel, and thus prevents the reaction of the force as a shear force as accomplished by known art, illustrated in FIG. 8. The hoop-stresses in turn place the material of the gate and gate wall in tension rather than in shear. It is well known that for steels the shear strength of steels is lower than the tensile strength. Accordingly, for a section of steel of a given cross-section, it is more structurally efficient to load the steel in tension rather than shear. However, known snap-hook designs with a gate lock mechanism use lock mechanisms that place the gate material in shear, as illustrated in FIG. 9.

To increase the load carrying capabilities of known locking snap-hook mechanisms one would have to make the components thicker or switch to higher strength materials. These approaches, however, lead to other problems, which make an inefficient design even less efficient. For instance, increasing the thickness of the components makes the snap-hook heavier, which is highly undesirable for these devices, which must be carried by workmen on lanyards and moved to engagement locations by the user.

Figure 6:
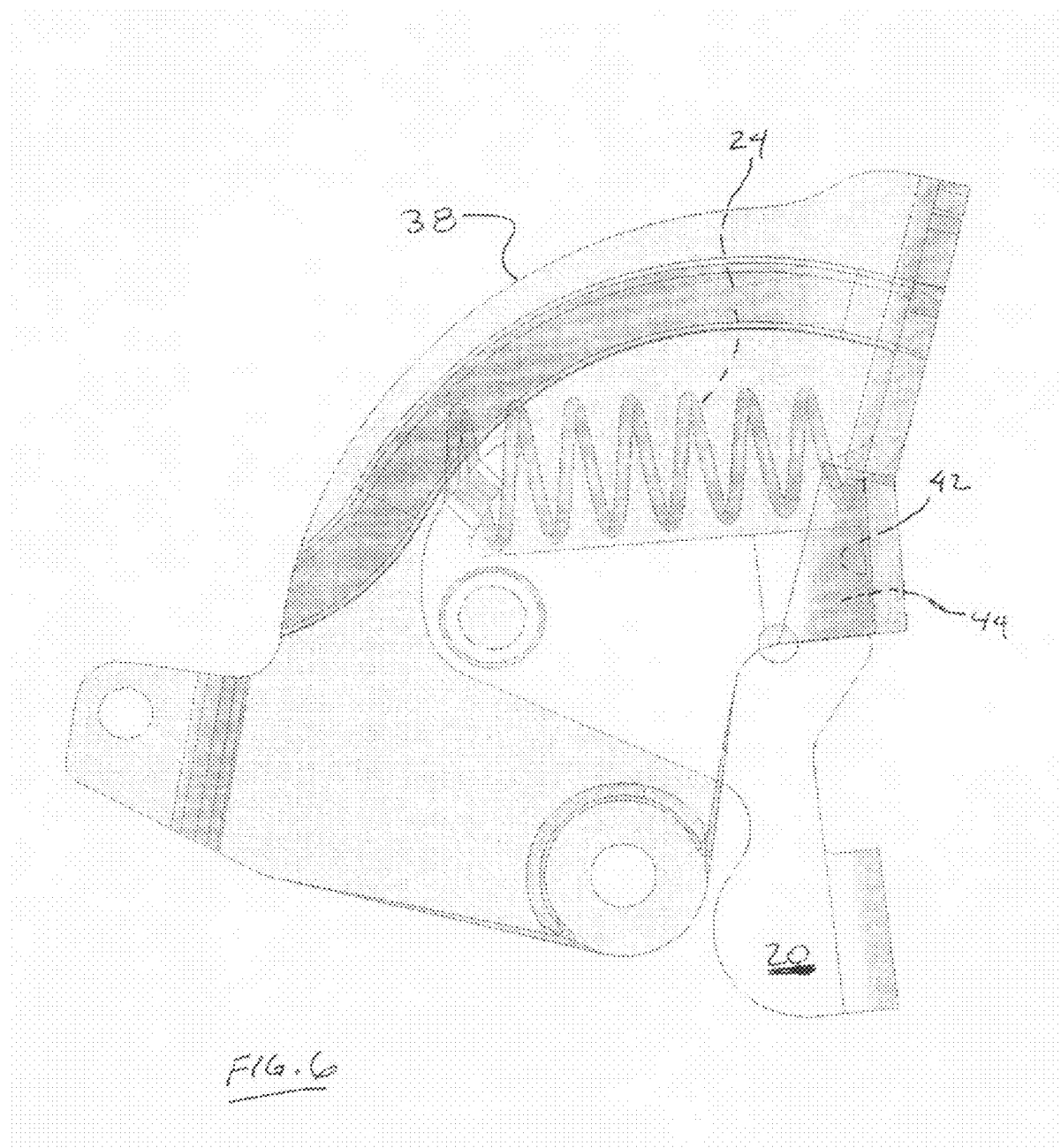
FIG. 6 is a side view of the gate, gate lock, and spring while the gate and gate lock retain the gate in the locked (closed) position.
Figure 7:
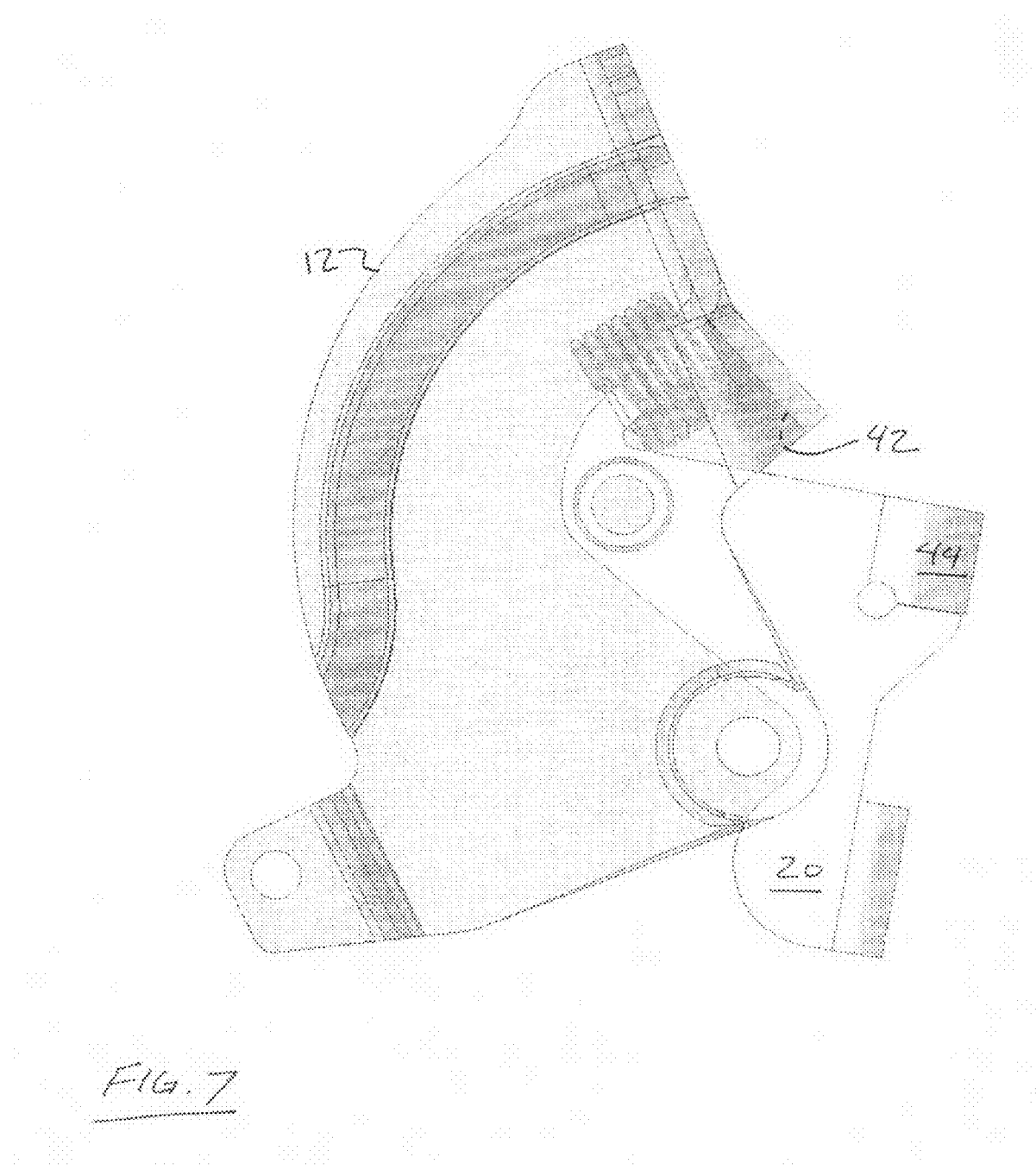
FIG. 7 shows the elements illustrated in FIG. 6, with the gate in the open position.

In order to engage and secure the disclose snap-hook, the gate 12 will be movable from a first gate position, illustrated in FIGS. 1 and 6, where the gate wall 36 closes the mouth 14 of the hook to a second gate position, illustrated in FIGS. 2 and 7, where the gate wall 36 is away from the nose 32, providing access through the mouth 14 of the hook.

In order to allow the gate to selectively lock and them move from the first gate position to the second gate position, the gate lock being pivotally mounted from the hook body, the gate lock 20 is moveable from a first lock position, illustrated in FIGS. 1 and 6, where the external cylindrical surface 44 of the gate lock is next to the cylindrical inner gate wall surface 42 when the gate lock 20 is in the first gate position and inhibiting rotation of the gate 12 relative to the hook body, to a second lock position, illustrated in FIGS. 2 and 7, where the external cylindrical surface 44 of the gate lock 20 is no longer next the cylindrical inner gate wall surface 42 of the gate, thereby allowing the gate to be moved to the second gate position. FIGS. 1, 2, 6, and 7 reveal that the gate and the gate lock rotate about parallel axes 70.

Additionally, as shown in FIGS. 1 and 3, it will be understood that it is contemplated that the hook body 22 will include a peninsula 50 that will extend between the gate 12 and the gate lock 20 to a location over the lower edge 52 of the gate in order to prevent the simultaneous pressing of the gate lock trigger 54 and the gate wall 36. This will prevent a solid object, such as a D-ring, from unintentionally releasing the gate 12 by simultaneously bearing against the gate lock trigger 54 and the gate wall 16.

As stated above, in a highly preferred embodiment of the invention the cylindrical inner surface 42 of the gate wall extends continuously between the sidewalls 34 of the gate 12. However, it is contemplated that approximations of this will achieve the loading of the gate in hoop-stress while the gate lock is in the first lock position while resisting a load against the gate wall, towards the mouth of the body.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A snap-hook with a locking gate, the snap-hook comprising:

A hook body having a J-shaped body with a shank and a curved portion, the curved portion extending from the shank and terminating in a nose that is at a distance from the shank to define a mouth;

A gate, the gate having a pair of sidewalls, the gate being pivotally mounted from the hook body and having a gate wall that is adapted for closing the mouth of the hook body, the gate wall having a generally cylindrical inner gate wall surface that extends between the pair of sidewalls and include a generally cylindrical inner gate wall surface, the gate being rotatable from a first gate position where the gate wall closes the mouth of the hook to a second gate position where the gate wall is away from the nose, providing access through the mouth;

A gate lock, the gate lock having an external cylindrical surface that includes a cylindrical surface that is adapted for mating with the cylindrical inner gate wall surface by having substantially the same curvature as the cylindrical inner gate wall surface, the gate lock being pivotally mounted from the hook body, the gate and the gate lock being rotatable by being pivotally mounted about parallel axes, the gate lock being rotatable from a first lock position where the external cylindrical surface of the gate lock is next to the cylindrical inner gate wall surface when the gate lock is in the first gate position and inhibiting rotation of the gate relative to the hook body, to a second lock position where the external cylindrical surface of the gate lock is no longer next the cylindrical inner surface of the gate wall, thereby allowing the gate to be moved to the second gate position.

* * * * *